(12) United States Patent
Ricci

(10) Patent No.: US 6,968,768 B2
(45) Date of Patent: Nov. 29, 2005

(54) SLITTING SAW

(76) Inventor: Donato L. Ricci, W8477-162nd Ave., Hager City, WI (US) 54017

( * ) Notice: Subject to any disclaimer, the term of this patent is extended or adjusted under 35 U.S.C. 154(b) by 97 days.

(21) Appl. No.: 10/625,368

(22) Filed: Jul. 23, 2003

(65) Prior Publication Data

US 2005/0016346 A1    Jan. 27, 2005

(51) Int. Cl.[7] ................................................ B26D 1/14
(52) U.S. Cl. ......................... 83/491; 83/469; 409/178
(58) Field of Search ........................ 83/469–494, 413, 83/414, 417, 420; 409/144, 178, 215

(56) References Cited

U.S. PATENT DOCUMENTS

| 974,036 | A | * | 10/1910 | Leeuw | 409/206 |
|---|---|---|---|---|---|
| 1,830,810 | A | * | 11/1931 | Russell | 212/172 |
| 1,937,965 | A | * | 12/1933 | Johnson | 384/420 |
| 1,976,107 | A | * | 10/1934 | Archea | 409/211 |
| 2,342,829 | A | * | 2/1944 | Armitage | 409/218 |
| 3,232,171 | A | * | 2/1966 | Hengehold | 409/211 |
| 3,709,624 | A | * | 1/1973 | Blank | 408/127 |
| 4,585,025 | A | * | 4/1986 | Hendrick | 137/315.38 |
| 5,709,511 | A | * | 1/1998 | Esmailzadeh | 409/199 |
| 6,862,946 | B2 | * | 3/2005 | Sumita et al. | 74/421 A |

* cited by examiner

Primary Examiner—Allan N. Shoap
Assistant Examiner—Carolyn T. Blake
(74) Attorney, Agent, or Firm—Nikolai & Mersereau, P.A.; Thomas J. Nikolai

(57) ABSTRACT

The disclosure describes a slitting saw used to cut an opening in a pipe. The saw generally comprises a housing mounted on an XYZ positioning system, a drive assembly and a cutting blade. A motor is used to drive a gear train which creates rotating of the cutting blade. The cutting blade makes a bevel cut into the pipe which allows for a new piece to be welded into the window cut by the present invention.

8 Claims, 4 Drawing Sheets

SLITTING SAW

BACKGROUND OF THE INVENTION

Field of the Invention

The present invention relates to a saw for simultaneously cutting and beveling a window into a wall of a pipe or vessel. The saw uses a cutting blade, a drive motor for rotating the cutting blade, and a housing enclosing the unit.

Steel pipes, which carry steam and/or water, will over time become worn and thin at points, especially at bends or intersections in the pipe. The old method of replacing worn portions of a pipe consisted of "torch cutting" out the bad section, grinding a bevel cut by hand, and then installing a replacement piece into the window with its bevel edges, welding it into place, and then grinding down the weld to smooth out the surface. This method is labor intensive. A need exists, therefore to provide a machine to replace the worn spots in the pipe, rather than replacing the entire pipe, in a faster and easier manner. The present invention permits one to cut a window into the pipe while simultaneously putting a bevel prep on the opening formed in the pipe as the window is being cut, thus eliminating the preparatory bevel grinding operation previously required.

SUMMARY OF THE INVENTION

The present invention provides a slitter saw used to cut an opening in a pipe, where the pipe is simultaneously cut and prepped for receiving a replacement part. The saw's housing is mounted on a xyz positioning system. The user can then position the saw against the pipe at a precise location using the three axis positioning system. Once a blade of the saw is properly positioned against the pipe to be cut a drive assembly is engaged for rotation of a cutting blade. The cutting blade is structured to make beveled incisions into the pipe such that once the cut piece is removed from the pipe a new prepped piece can be inserted in its place and welded into place. A drive motor engages a gear train for rotating a series of shafts, which are operatively coupled to the cutting blade.

BRIEF DESCRIPTION OF THE DRAWINGS

The foregoing features, object and advantages of the invention will become apparent to those skilled in the art from the following detailed description of the preferred embodiment, especially when considered in conjunction with the accompanying drawings in which like numerals in the several views refer to corresponding parts.

DESCRIPTION OF THE PREFERRED EMBODIMENT

Figure 1:
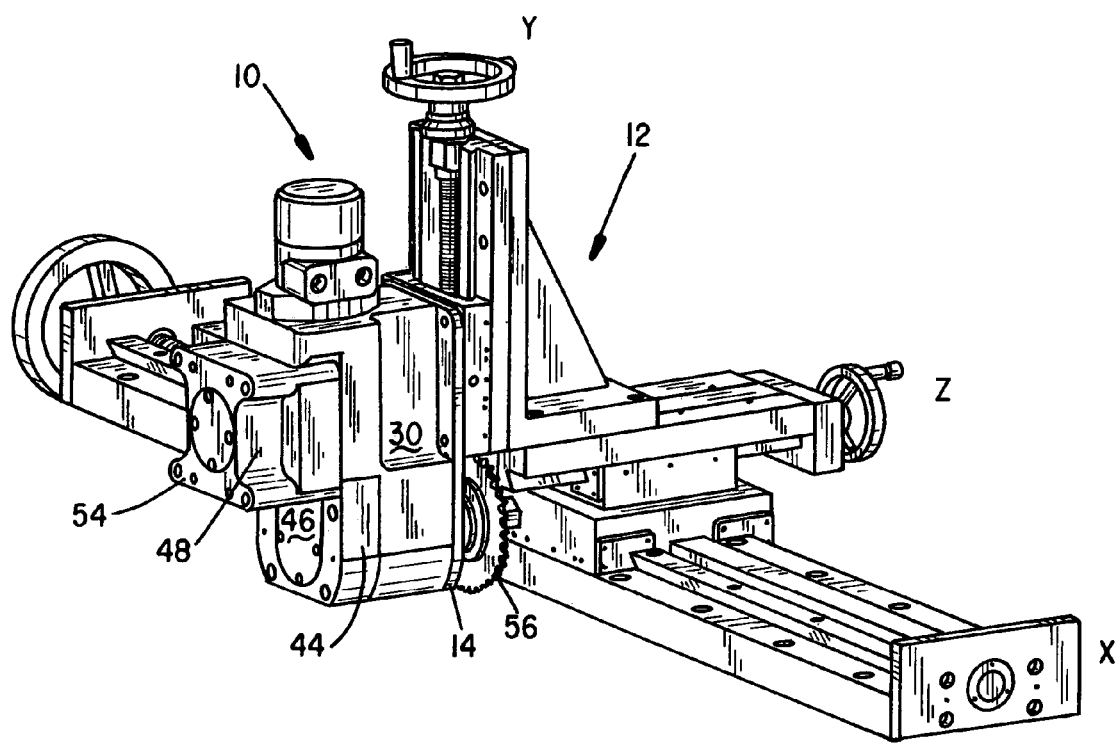
FIG. 1 is a front perspective view of a slitting saw construed in accordance with the present invention, where the slitting saw is mounted on a xyz positioning system.

FIG. 1 shows the claimed slitting saw assembly mounted on a xyz positioning system. The slitting saw assembly is generally indicated by the numeral 10 and the xyz positioning system is generally indicated by the number 12.

Figure 2:
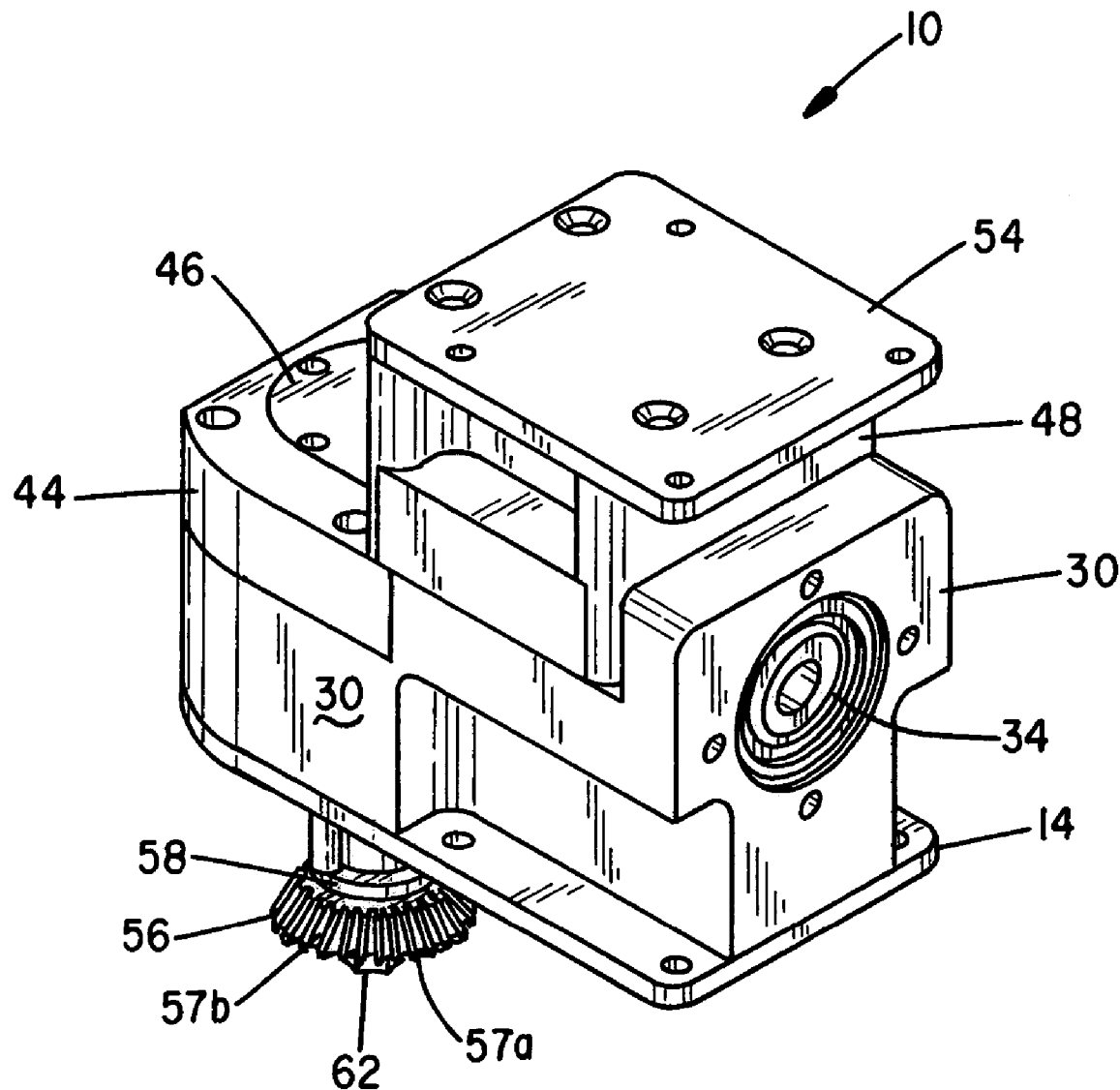
FIG. 2 is a top perspective view of the present invention.
Figure 3:
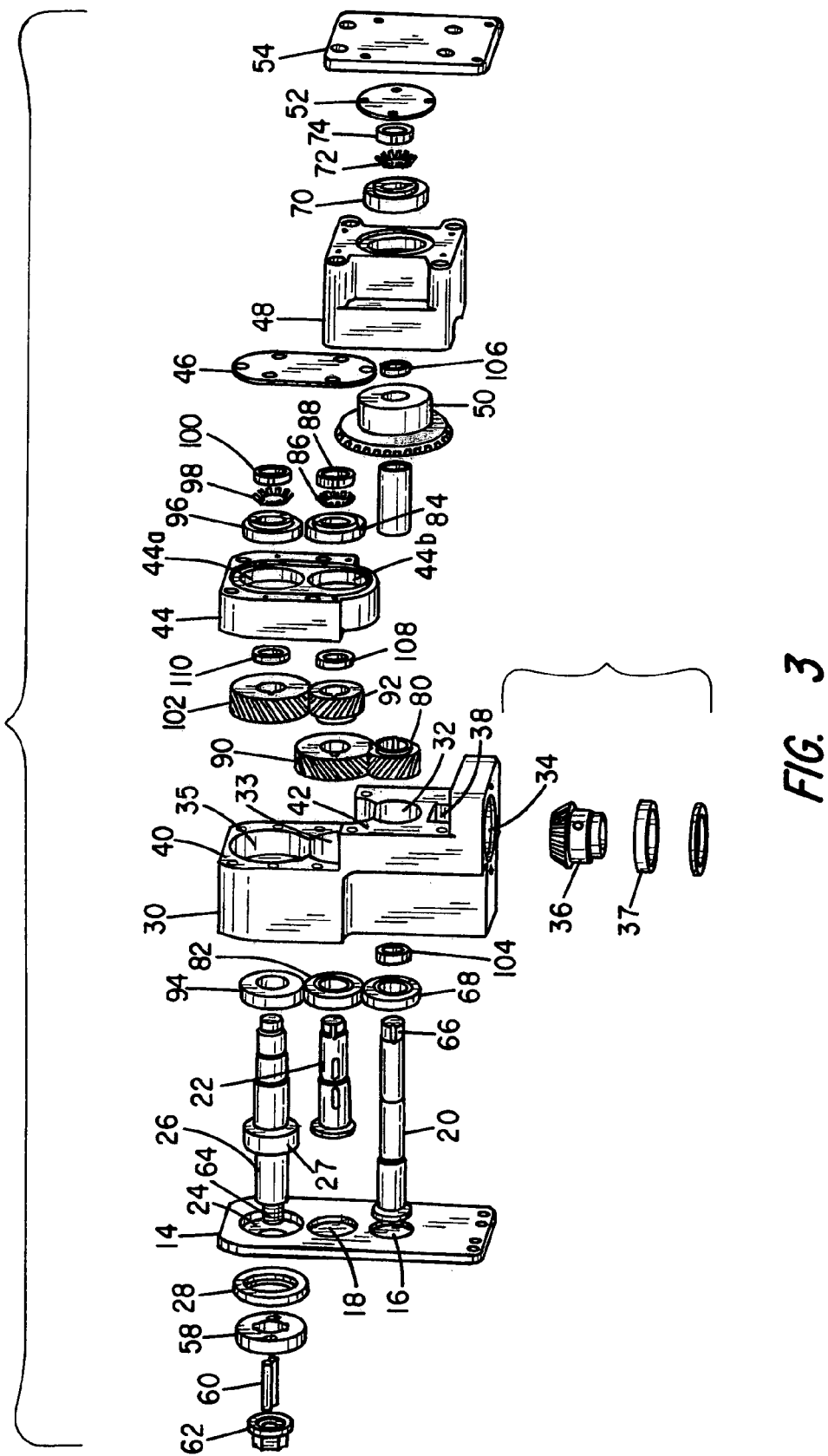
FIG. 3 is an exploded view of a the present invention.

FIG. 2 is a perspective view of the housing which encloses the drive assembly. A bottom cover plate 14 is provided as support for the shafts used in a gear train of the drive assembly to be described below. As seen in FIG. 3, two generally annular recesses 16 and 18 are provided in the plate 14 to provide clearance for the rotation of the shafts 20 and 22 in the gear train. The drive shaft 20 rests in recess 16 and idler shaft 22 rests in recess 18. A generally circular aperture 24 is cut through the base cover plate 14 allowing a cutter shaft 26 to pass through the cover plate 14. An elastomeric single lip seal 28 surrounds an annular stop 27 in the center portion of the cutter shaft 26 to prevent ingress of metal particles into the housing assembly. A gearbox case 30 is mounted to the bottom cover plate 14 by bolts (not shown). A series of generally circular and interconnected apertures 32, 33, and 35 are provided in the gearbox case to accommodate the aforementioned gear train. The drive shaft 20, idler shaft 22, and cutter shaft 26 each extend through the interconnected circular apertures 32, 33, and 35. The generally circular interconnected apertures 32, 33, and 35 are sized to accommodate the various gears 80, 90, 92, and 102 in the gear train.

A single horizontal side aperture 34 is provided in the gearbox case 30 for receiving a first bevel gear 36 where the first bevel gear 36 penetrates the single horizontal aperture 34 and a semi-circular recess 38 is provided for accommodating of the first bevel gear 36 within the gearbox case 30.

The gearbox case 30 has two levels along the vertical length dimension. The shorter level 40 is adjacent to the longer level 42. A bearing housing 44 rests on and is bolted to the top of the shorter level 40 of the gearbox housing 30. The bearing housing 44 has two circular apertures 44a and 44b which accommodate bearings 96 and 84 respectively. A bearing cover 46 is provided to insure that bearings 84 and 96 are not exposed to metal particles generated as a workpiece is being cut.

A bevel gear housing 48 surrounds the second bevel gear 50 and is bolted to the top level 42 of the gearbox housing 30. A bevel gear cover 52 is affixed with screws to the top of the bevel gear housing 48 and a top cover plate 54 is likewise secured to the top of the bevel gear housing 48.

Figure 4:
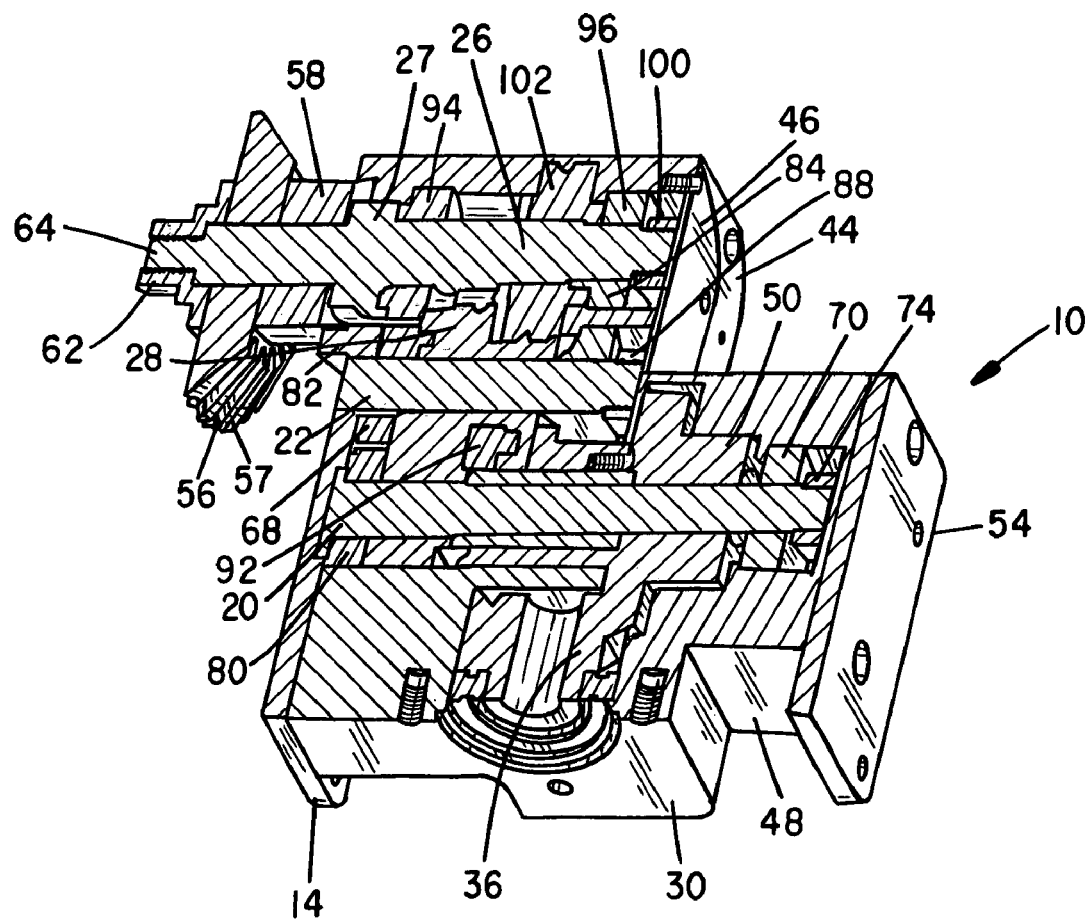
FIG. 4 is a cross sectional view of the present invention.

As shown in FIGS. 1 and 4, a cutting blade 56 is disposed at the bottom of the slitting saw 10 adjacent the bottom plate 14. The cutting blade 56 has seven-blade surface on its perimeter and a bevel blade surface 57, as best seen in FIG. 4. The cutter shaft 26 protrudes through the circular aperture 24 of the bottom cover plate 14. The bottom of the cutter shaft 26 is then inserted through a blade collar 58. A cutting blade 56 is operatively coupled to the cutter shaft 26 such that rotation of the cutter shaft results in rotation of the cutting blade 56. The cutting blade 56 is secured to the cutter shaft 26 first by inserting a pair of dowels 60 through the base of the cutting blade 56 and into two corresponding apertures 62 in the blade collar 58, and a locknut 62 screws onto the threaded ends 64 of the cutter shaft 26.

Rotation of the cutting blade 56 is affected by the gear train. Specifically, the first bevel gear 36 journaled for rotation in the horizontal side aperture 34 of the gearbox housing 30 by means of ball bearings 37 that set in aperture 34. The teeth of the first bevel gear 36 mesh with the teeth of the second bevel gear 50. The second bevel gear 50 is operatively keyed to the drive shaft 20 such that rotation of the first bevel gear 36 translates to rotation of the drive shaft 20. The drive shaft is journaled for rotation in the housing by a first and second bearing 68 and 70 that are mounted proximate to the opposite ends of the drive shaft 20. The first bearing 68 is generally positioned at the lower end of the drive shaft 20 near the base plate 14 when viewed as in FIG. 3. The second bearing 70 is positioned on the drive shaft 20 between the second bevel gear 50 and a threaded end 66 of the drive shaft. The second bearing 70 is preferably a TIMKEN bearing that is held on the drive shaft by a lock washer 72 and a threaded nut 74. A first helical gear 80 is operatively keyed to the drive shaft 20 as well.

The idler shaft 22 is disposed parallel to the drive shaft 20 in the gear housing 30. The idler shaft 22 is journaled for rotation by a third and fourth bearing 82 and 84 where the third bearing 82 is mounted at the base of the idler shaft 22 near the base plate 14. Bearings 82 and 84 are, again, preferably TIMKIN bearings that can be periodically adjusted as they wear. The fourth bearing 84 is mounted near the top of the idler shaft 22 and fixed to the shaft by a washer 86 and threaded nut 88. A second helical gear 90 is operatively locked to the idler shaft 22 by a key member (not shown). The second helical gear 90 meshes with the first helical gear 80. A third helical gear 92 is also mounted on idler shaft 22 in between the second helical gear 90 and the fourth bearing 84. The third helical gear 92 is operatively keyed to the idler shaft 22 for rotation therewith.

The bottom portion of the cutter shaft 26 passes through the bottom aperture 24 of the base plate 14. The cutter shaft 26 is journaled for rotation in the bottom aperture 24 by a fifth bearing 94 that sits in the aperture 24 and a sixth bearing 96. The fifth bearing 94 is mounted directly on top of the annular stop 27 and the sixth bearing 96 is seated in the aperture 44a such that the top portion of the cutter shaft 26 is supported thereby. A lock washer 98 and threaded nut 100 secures the shaft 26 in place. Operatively keyed to the cutter shaft 26 is a fourth helical gear 102 which is located between the fifth bearing 94 and the sixth bearing 96 on the cutter shaft 26. The fourth helical gear 102 meshes with the third helical gear 92 to transfer motion from the idler shaft 22 to the cutter shaft 26.

A speed reducing gear train is now formed in the slitting saw 10. A motor which may be electric, pneumatic or hydraulic is adapted to be connected to rotate the first bevel gear 36 which engages the teeth of the second bevel gear 50 rotating the second bevel gear. Since the second bevel gear 50 is operatively keyed to the drive shaft 20 the bevel gears transfer rotation to the drive shaft 20. Rotation of the drive shaft 20 results in rotation of the first helical gear 80 which is engaged with the second helical gear 90 causing rotation of the idler shaft 22. The third helical gear 92 is also operatively keyed to the idler shaft 22 such that the rotation of the idler shaft 22 causes rotation of the third helical drive gear 92. Because the third helical gear 92 meshes with the fourth helical gear 102, rotation of the idler shaft is transferred to the cutter shaft 26. Rotation of the cutter shaft 26 results in rotation of the cutting blade 56.

To insure that the relevant gears mesh properly a first spacer 104 is mounted on the drive shaft 20 between the first bearing 68 and the first helical gear 80. A second spacer 106 is mounted on the drive shaft 20 between the second bevel gear 50 and the second bearing 70. A third spacer 108 is mounted between the top of the third helical drive gear 92 and the fourth bearing 84 so that the fourth bearing is property aligned. A fourth spacer 110 is placed between the top of the fourth helical gear 102 and the sixth bearing 96 so as to align the sixth bearing 96 and the fourth bearing 84.

The saw blade 56 is divided into a sever blade 57a and a bevel blade 57b. The sever blade 57a makes an initial incision into the pipe and the bevel blade 57b bevels the edge of the incision. The XYZ positioner 12 allows the length and depth dimensions to be set so that two parallel vertical cuts can be made on the pipe. The workpiece is then repositioned to make two parallel horizontal cuts on the pipe. The cuts intersect so that a window is cut into the side of the pipe. Once the window is cut into the pipe, it can be filled with a similarly shaped plug cut from a tubular member of the same diameter as the pipe. The plug cut can be made from the slitter saw as well. The plug is welded into the window with the bevel edges of the plug mating with the beveled edges of the window.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A slitting saw used to cut an opening in a pipe comprising:
    a) a housing;
    b) a cutting blade apparatus; and
    c) a drive assembly enclosed in the housing for rotating said cutting blade apparatus, the drive assembly including a gear train including a series of shafts including a drive shaft journaled by first and second wear adjustable bearings, an idler shaft journaled by third and fourth wear adjustable bearings, and a cutter shaft journaled by fifth and sixth wear adjustable bearings each of said shafts being journaled in their respective bearings for rotation in said housing wherein the cutting blade apparatus is operatively coupled to the cutter shaft, said gear train having
        i) a first and a second bevel gear wherein the first bevel gear rotates on an axis perpendicular to an axis of the drive shaft and the second bevel gear rotates on the axis of the drive shaft, wherein rotation of the first bevel gear transfers rotational motion to the drive shaft;
        ii) a first helical gear mounted on the drive shaft and coupled in driving relation to a second helical gear mounted on the idler shaft wherein the first and second helical gears mesh so as to impart rotation to the idler shaft; and
        iii) a third helical gear mounted on the idler shaft and a fourth helical gear mounted on the cutter shaft and meshing with the third helical gear so as to transfer rotational motion from the idler shaft to the cutter shaft,
    said drive assembly further including a drive motor for rotating the gear train, and said housing including
        i) a bottom cover plate on which the drive shaft, idler shaft, and cutter shaft rest;
        ii) a gearbox case secured to the bottom cover plate for housing the first, second, third and fourth helical gears and the first bevel gear;
        iii) a bearing case affixed to the gearbox case for containing the fourth and sixth wear adjustable bearings journaling the idler shaft and the cutter shaft; and
        iv) a bevel gear case affixed to the gear box case for housing the second bevel gear, and one of the first and second bearings journaling the drive shaft.

2. The slitting saw in claim 1 wherein:
    a) the drive shaft has one threaded end and is journaled for rotation in said housing by said first and second wear adjustable bearings where the first and second wear adjustable bearings are mounted proximate opposite ends the drive shaft;

b) a first spacer is mounted on the drive shaft between the first wear adjustable bearing and the first helical gear;

c) a second spacer is mounted on the drive shaft between the second bevel gear and the first helical gear; and d) the second wear adjustable bearing is held on the drive shaft by a washer and a nut screwed onto the one threaded end.

3. The slitting saw in claim 2 wherein:

a) the third wear adjustable bearing is mounted at a base of the idler shaft and the fourth wear adjustable bearing is mounted on a top of the idler shaft;

b) a spacer is mounted between the third helical gear and the fourth wear adjustable bearing so that the fourth wear adjustable bearing is properly aligned; and c) the fourth wear adjustable bearing being fastened on the idler shaft by a washer and nut.

4. The slitting saw in claim 3 wherein:

a) the fifth wear adjustable bearing is mounted adjacent the fourth helical gear;

b) a spacer is placed between the fourth helical gear and the sixth wear adjustable bearing so as to align the third helical gear and fourth helical gear; and c) the sixth wear adjustable bearing is fastened to the cutter shaft by a nut and washer.

5. The slitting saw in claim 1 wherein the bottom cover plate includes two annular recesses for receiving a bottom portion of the drive shaft and a bottom portion of the idler shaft.

6. The slitting saw in claim 5 wherein the bottom cover plate further includes an annular aperture for receiving the bottom portion of the cutter shaft therethrough.

7. The slitting saw in claim 5 wherein the cutting apparatus includes:

a) an annular collar with a central aperture for receiving the cutter shaft therethrough;

b) a cutting blade; and c) a lock nut for securing the cutting blade to the collar.

8. The slitting saw in claim 1 wherein the drive motor is selected from a group consisting of an electrically powered motor, a pneumatically powered motor and a hydraulically powered motor.

* * * * *